2,773,794
MELAMINE CONDENSATION PRODUCTS

George L. Fraser, Wilbraham, and Curtis Elmer, Springfield, Mass., assignors to Monsanto Chemical Company, St. Louis, Mo., a corporation of Delaware No Drawing. Application March 19, 1953,
Serial No. 343,491

5 Claims. (Cl. 154—138)

This invention relates to melamine formaldehyde resins having greatly increased flow properties before final curing. More particularly the invention relates to melamine formaldehyde laminating syrups and to laminates prepared therewith.

One of the major potential uses of melamine formaldehyde condensation products is in the field of laminating syrups. The initial condensation product is prepared in such a manner that it is still soluble in or readily dispersible in water or mixtures of water and lower alkanols and the solutions and dispersions thereof are used for impregnating paper, wood, textiles, glass fibers, etc. followed by lamination thereof to similar or dissimilar surfaces under heat and pressure.

The normal melamine formaldehyde condensates are adequate for this purpose but have the disadvantage that great care must be used in their application to the material to be laminated because the flow of the condensates under heat and pressure is strictly limited.

One object of this invention is to provide new laminating varnishes and syrups and laminates made therewith.

A further object is to provide melamine formaldehyde laminating varnishes and laminates.

Another object is to modify melamine formaldehyde condensates to improve the flow thereof under heat and pressure prior to the final cure thereof.

These and other objects are attained by reacting a minor proportion of phenyl melamine and a major proportion of melamine with formaldehyde, impregnating porous materials with the reaction products and preparing laminates therefrom.

As used in this invention, the term "phenyl melamine" is intended to mean melamine in which a single hydrogen atom on a single amino group has been replaced by a benzene ring which may or may not have ring substituents. Where ring substituents are present they will be specifically mentioned. Among the phenyl melamines which are operative in this invention are phenyl melamine itself, halophenyl melamines and in particular the mono and dichlorophenyl melamines, nitrophenyl melamines, alkylphenyl melamines, etc.

The following examples are given in illustration and are not intended as limitations on the scope of this invention. Where parts are mentioned they are parts by weight.

Example I

Mix together 113 parts of melamine (0.9 mol), 30 parts of phenyl melamine (0.15 mol), 202 parts of formalin (about 2.5 mols of formaldehyde) and 34 parts of water and adjust the pH of the mixture to 9–10 with aqueous alkali. Heat the mixture to reflux for a brief time and then reduce the temperature thereof to 50–60° C. Continue the reaction at 50–60° C. for about 5 hours stopping the reaction when a sample of the reaction mixture turns cloudy when cooled to about 10° C. Cool and filter the reaction product. It is an aqueous solution of a co-condensate of phenyl melamine and melamine with formaldehyde having a viscosity of about 125 centipoises.

Example II

Impregnate alpha cellulose paper with the syrup obtained in Example I by dipping the paper in the syrup and removing it slowly therefrom while drawing over scraper bar to remove excess resin. Then dry the paper until the volatile content thereof is about 2–5% by weight. With a syrup of the viscosity of about 125 centipoises a resin pickup of about 60–65% by weight is obtained. Cut the impregnated and dried paper into twelve pieces of approximately the same size, stack the pieces one on top of the other and weigh the stack accurately. Laminate the stack of cut pieces under a pressure of 1000 p. s. i. at 150° C. for three minutes. Cool the laminate, cut off the flash i. e., the resin that has flowed out beyond the periphery of the laminate, and weigh the laminate. The flow of the resin is calculated by dividing the weight of the flash by the total weight of the original unpressed stack. With the laminating syrup of Example I the flow at 3% volatiles is about 15%.

The procedure outlined in Example II is a standard flow test in the laminating industry. Under optimum laminating conditions a flow of 10–12% is required.

When Example II is repeated using a standard melamine formaldehyde laminating syrup a flow of 7–8% is obtained at the same volatile content reached in Example II.

Example III

Prepare a laminating syrup by mixing together 113 parts of melamine, 35 parts of ortho-chlorophenyl melamine, 202 parts of formalin and 34 parts of water and adjust the pH of the reaction mixture to about 9–10 with aqueous alkali. Heat the reaction mixture at 50–60° C. until a sample turns cloudy when it is cooled to about 10° C. Cool the reaction medium and filter. The product is an aqueous syrup of a co-condensation production of orthochlorophenyl melamine and melamine with formaldehyde and has a viscosity of about 150 centipoises. When the flow test described in Example II is carried out on this laminating syrup a flow of 12% is obtained at 3% volatiles.

Example IV

Prepare a laminating syrup by mixing together 113 parts of melamine, 40 parts of 2,5-dichlorophenyl melamine, 202 parts of formalin and 35 parts of water, adjusting the pH to about 9–10 with aqueous alkali and heating the mixture at 50–60° C. until a sample turns cloudy on cooling to 10° C. The product is a syrup of a co-condensate of 2,5-dichlorophenyl melamine and melamine with formaldehyde. The syrup has a viscosity of about 150 centipoises. Flow tests on laminates prepared with this syrup show a flow of about 12% at 3% volatiles.

Example V

Prepare a laminating syrup by mixing together 113 parts of melamine, 32 parts of p-methylphenyl melamine, 202 parts of formalin and 35 parts of water, adjusting the pH to about 9–10, and heating the mixture at 50–60° C. until a sample turns cloudy when cooled to about 10° C. The product is an aqueous syrup of a co-condensate of p-methylphenyl melamine and melamine with formaldehyde, said syrup having a viscosity of about 150 centipoises. In the flow test, laminates prepared with this syrup show a flow of about 12% at 3% volatiles.

*Example VI*

Mix together 100 parts of melamine, 35 parts of phenyl melamine, 200 parts of formalin and 40 parts of water. Adjust the mixture to a pH of 9–10 and heat the mixture at 50–60° C. with vigorous agitation. As soon as a sample of the reaction mixture turns cloudy when cooled to about 10° C., stop the reaction by cooling the reaction medium. Spray dry the aqueous syrup thus obtained. The product is a white pulverulent material which may be readily dispersed in water. The powder is fusible and may be cured under heat and pressure to an insoluble infusible state. Laminate two pieces of wood by placing between the pieces a thin layer of the powder followed by heating the sandwich at 150° C. for ten minutes at 500 p. s. i. During the laminating step the resin flows readily to form a thin continuous film which penetrates the fibers of the wood and bonds the pieces of wood together.

*Example VII*

Mix together 126 parts of melamine, 20 parts of phenyl melamine, 324 parts of formalin and 20 parts of water. Adjust the pH of the mixture to about 9–11 and then heat the mixture under refluxing conditions at atmospheric pressure accompanied by vigorous agitation until the cloud point is reached. Then cool the reaction medium and recover the reaction product by spray drying. The product obtained is a fusible white powder. Blend 100 parts of the powder with 100 parts of a fibrous filler such as wood flour and mold the blend into a tray, cup or other article under heat and pressure. Pressures of 100 to more than 1000 p. s. i. are suitable and temperatures of from 100–250° C. may be used. On removal from the press, an article having high gloss and excellent chemical and physical resistance is obtained. It is found that the resin has substantially completely surrounded and impregnated the filler and has completely filled out the mold.

The resins of this invention are co-condensation products of a phenyl melamine with melamine and formaldehyde. To obtain the benefits of the invention without losing the excellent properties of unmodified melamine resins the amount of phenyl melamine should be restricted to between 0.1 and 0.3 mol per mol of melamine.

The phenyl melamines which may be used are monophenyl amino diamino triazines in which the phenyl group may contain 1 to 2 substituents on the ring. The substituents may be halogen atoms including fluorine, chlorine, bromine and iodine, nitro groups and alkyl groups containing up to 9 carbon atoms. The alkyl groups may be straight or branched chain but they should be saturated and contain no substituents.

The formaldehyde may be replaced in part by other aldehydes or ketones but formaldehyde should be present in a major proportion on a molar basis. The amount of formaldehyde may vary between 1 and 6 mols per mol of combined melamine and phenyl melamine. For laminating syrups, the amount of formaldehyde is preferably maintained between two and three mols per mol of combined melamine and phenyl melamine. For molding powders it is frequently better to use more formaldehyde.

The reaction between the melamine, phenyl melamine and aldehyde should be carried out at a pH of from 8–12 and preferably from 9–11. The pH is conveniently adjusted with an aqueous alkali. The temperature of the reaction may be varied from 40° C. to reflux temperature at atmospheric pressure. For purposes of accurate control of the reaction rate and the properties of the reaction product, the temperature should be limited to 50–70° C. for the greater part of the reaction time. A convenient procedure is that shown in Example I wherein the original mixture is brought to reflux temperature to initiate the reaction and the temperature is then reduced to 50–60° C.

The resins of this invention may be further modified in part by reaction thereof with small amounts of alcohols and aryl sulfonamides but these modifiers should be restricted to less than 0.5 mol per mol of combined melamine and phenyl melamine.

The laminating syrups of this invention are preferably aqueous solutions of the co-condensation products said co-condensation reaction having been terminated at the hydrophobe point, i. e. while the resins are still water-soluble and fusible. Under some conditions it may be desirable to dilute the water with small amounts of aliphatic alcohols especially if the condensation has proceeded so far that the resins are more soluble in the alcohol than the water. However, it is easy to control the reaction by determining the hydrophobe point so that the use of an alcohol is not a requisite.

The resins of this invention may be cured to an insoluble, infusible state by heating them to 100–250° C. without the aid of a curing catalyst. Pressures of at least 50 p. s. i. should be used to obtain a dense non-porous product.

Various additives may be incorporated in the resins of this invention to achieve special results. Among the conventional additives are fillers, pigments, lubricants, dyes etc.

The most advantageous field for the use of the resins of this invention is that of laminating syrups. The resins make it possible to obtain optimum flow at extremely low volatile content. By making possible a minimum of volatiles, many of the characteristic defects of the laminating process are eliminated. Thus a finished laminate may be prepared easily without bubbles, blisters and surface crazing and the laminate has a hard glossy surface. The syrups may be applied to various sheet materials whether they are prepared by felting or weaving processes. Among the materials which have proven adaptable are paper, textiles, glass cloth, plywood etc. In preparing many laminates, the core may be of a material quite different from the surface sheet or overlay. The high gloss and superior flow qualities of the resins of this invention make them especially suitable for the overlay sheet and particularly where the overlay sheet is laminated over a decorated surface.

What is claimed is:

1. In the method for preparing a laminate in which a plurality of resin-impregnated layers of fibrous material are assembled in superimposed relationship, placed under pressure and heated until the resin has cured, the improvement which comprises impregnating said fibrous material with a co-condensation product of melamine, a phenyl melamine, and formaldehyde, the molar ratio of melamine to phenyl melamine varying between 1:0.1–1:0.3 and the molar ratio of combined melamine and phenyl melamine to formaldehyde varying between 1:2 and 1:3, said co-condensation product having been prepared at a pH of 8–12, said phenyl melamine being a member of the group consisting of phenyl melamine, monochlorophenyl melamines, dichlorophenyl melamines, nitrophenyl melamines, and alkylphenyl melamines in which the alkyl group is saturated and contains up to 9 carbon atoms.

2. The process of claim 1 wherein the resin employed is a co-condensation product of melamine, phenyl melamine, and formaldehyde.

3. The process of claim 1 wherein the resin employed is a co-condensation product of melamine, orthochlorophenyl melamine, and formaldehyde.

4. The process of claim 1 wherein the resin employed is a co-condensation product of melamine, 2,5 dichlorophenyl melamine, and formaldehyde.

5. The process of claim 1 wherein the resin employed is a co-condensation product of melamine, paramethylphenyl melamine, and formaldehyde.

References Cited in the file of this patent

UNITED STATES PATENTS

| | | |
|---|---|---|
| 2,368,451 | D'Alelio | Jan. 30, 1945 |
| 2,385,384 | Schroy | Sept. 25, 1945 |
| 2,430,708 | D'Alelio | Nov. 11, 1947 |
| 2,484,315 | Scott | Oct. 11, 1949 |
| 2,489,145 | Lieb et al. | Nov. 22, 1949 |

FOREIGN PATENTS

| | | |
|---|---|---|
| 130,310 | Australia | Mar. 25, 1946 |
| 967,064 | France | Mar. 22, 1950 |